May 2, 1967  HANS-JOACHIM JANSSEN  3,317,166
MOUNTING
Filed July 9, 1964
2 Sheets-Sheet 1
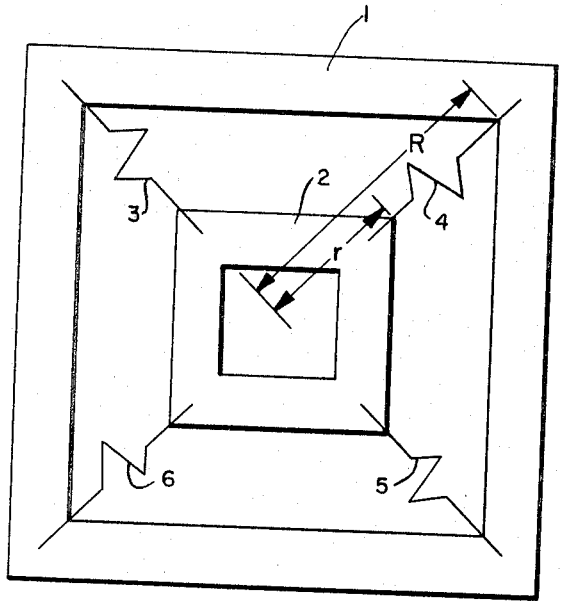
FIG. 1.
FIG. 2.
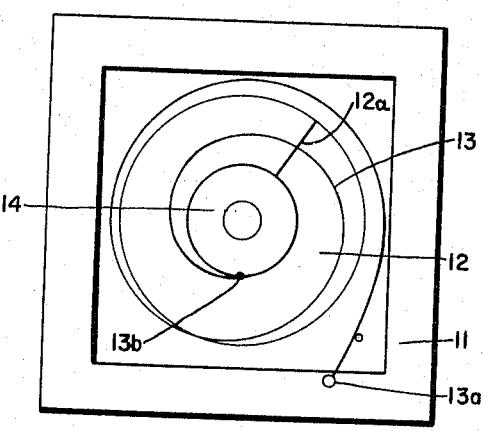
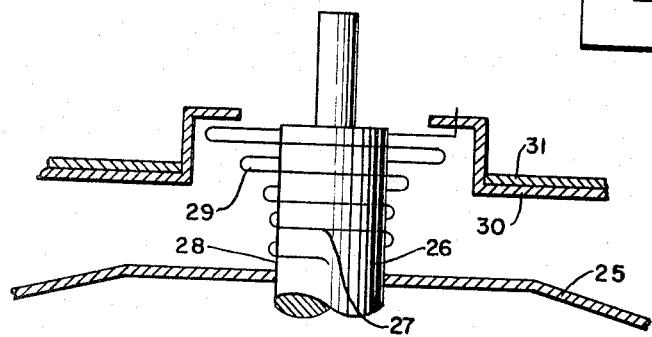
FIG. 3.
INVENTOR
Hans-Joachim Janssen
BY Spencer & Kaye
ATTORNEYS May 2, 1967   HANS-JOACHIM JANSSEN   3,317,166
MOUNTING Filed July 9, 1964

INVENTOR
Hans-Joachim Janssen

BY Spencer & Kaye

ATTORNEYS

United States Patent Office 3,317,166
Patented May 2, 1967

3,317,166
MOUNTING
Hans-Joachim Janssen, Hundsmuhlen uber Oldenburg, Oldenburg, Germany, assignor to Licentia Patent-Verwaltungs-G.m.b.H., Frankfurt am Main, Germany
Filed July 9, 1964, Ser. No. 381,422
Claims priority, application Germany, July 9, 1963, L 45,346; Dec. 19, 1963, L 46,652
23 Claims. (Cl. 248—26)

The present invention relates to a resilient mounting arrangement for mounting small electric motors in such a manner as to insulate the motor vibrations. The invention is particularly applicable for use in sound recording and reproducing apparatus in which motor vibrations have to be prevented from affecting the recording and playback. It is, therefore, the primary object of the present invention to provide a mounting element which will effectively carry out this function, which is inexpensive to manufacture, and which may be built into a piece of equipment.

Accordingly, the present invention resides, mainly, in a resilient mounting for use with small electric motors for insulating vibration thereof, which mounting comprises two frames and resilient web means interconnecting these frames, these webs acting as springs and lying within an annular space which is coaxial with the axis of the motor, the ratio of the inner radius of this space to the outer radius thereof being 1:2 or less.

Additional objects and advantages of the present invention will become apparent upon consideration of the following description when taken in conjunction with the accompanying drawings in which:

FIGURE 1 is a plan view of one embodiment of a mounting according to the present invention.

FIGURE 2 is a plan view of another embodiment of a mounting according to the present invention.

FIGURE 3 is an elevational view, partly in section, of another embodiment of a mounting according to the present invention.

Figure 1A:
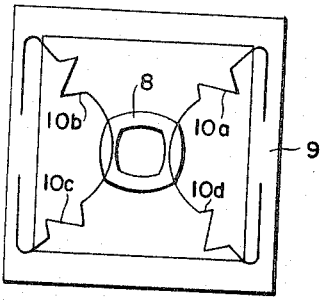
FIGURE 1a is a plan view of a further embodiment of a mounting according to the present invention.

Referring now to the drawing and to FIGURE 1 thereof in particular, the same shows a mounting according to the present invention, which includes two separate frames 1 and 2, of different sizes, the same being arranged one within the other and being generally concentric. The two frames are interconnected with each other by resilient web means constituted, in the embodiment of FIGURE 1, by four resilient webs 3, 4, 5, 6, shown to have a zigzag configuration.

In practice, the frames and webs may be made of a single integral piece, which itself may be metal or plastic. Alternatively, the frames may, for example, be made of plastic and the webs of metal, which elements are then connected to each other. As shown in FIGURE 1, the frames may be square; alternatively, they can be rectangular, polygonal, or circular.

The frames are provided with fitted surfaces which allow the mounting to be seated precisely. In order to obtain effective vibration insulation, the mounting will be interposed between the hub of an electric motor, which itself is centrally held at its two ends, and the corresponding support for the hub. Such an arrangement finds particular application in tape recorders and other sound reproducing equipment.

In the case of circular frames, the fitted surfaces may be provided with projections or indentations, such as lugs, grooves or axially extending ribs, which receive or are received by, complementarily formed parts of the motor hub or machine support, thereby to prevent rotation of the mounting with respect to the components which the mounting interconnects.

According to another feature of the present invention, either or both of the frames can be split, thereby to allow the frame or frames to be mounted in the manner of a snap ring. Either or both of the frames may be provided with flanges which positively engage a member to which the mounting is to be connected, thereby to prevent lateral displacement of the mounting.

The webs may extend generally radially between the two frames which themselves may be coplanar. The webs may be either zig-zag as shown in FIGURE 1, or they can extend generally rectilinearly or follow curved configurations. In practice, the webs can be constituted by metal wires or resilient metal blades or leaf springs. The number of webs, their cross-sectional configuration, the material of which the webs are made, and their distribution between the frames, will all be factors influencing the spring constant of the mounting as a whole. In practice, the spring constant of each mounting can be adapted, within wide limits to the rotary as well as axial and radial vibrations of the motor.

If the mounting has plastic frames and webs constituted by metal wires or metal blades, the ends of the webs can be firmly attached to the frames, either by being inset or by being cast thereinto during the molding process by which the frames are made. In the case of metal wires, the same can run through the plastic frames, i.e., be embedded therein. The embedded reaches of the wires can be either straight or undulated.

A mounting according to the present invention has a number of advantages over the prior art. For one thing, the mounting, which, as explained above, can readily be non-rotatably secured, may be mounted very close to the rotary axis of the rotation oscillations which are to be insulated. This means that the hub of an electric motor, used in recording equipment and attached at its ends, can have a very small diameter. This results in maximum insulation of the rotary oscillations with supercritical tuning, far above the extent heretofore possible, by an extreme transformation of the spring constants. Furthermore, the mounting offers a very large resistance to radial loading, depending on the shape, cross section, material, distribution and configuration of the webs. The motor is insulated very well against rotary oscillations, and at the same time it can be mounted at its center in such a manner as to allow it to be subjected to radial forces, this being the case, for example, when the motor drives a component located radially with respect to the motor. The mounting also insulates well against axial oscillations.

The great mechanical strength of the mounting according to the present invention also affords protection against shocks, to which sound reproducing equipment is sometimes subjected, particularly when it is moved from one place to another.

It will be seen from the above that the mounting element according to the present invention obtains advantages which can not be realized by using mounting elements made wholly of rubber, irrespective of the configuration of such rubber mountings.

Of particular advantage is the fact that the mounting can be made flat, namely, by arranging the two frames, as well as the webs, in substantially the same plane. Furthermore, the mounting, if it incorporates plastic frames, has excellent electrical insulation characteristics as well.

According to another feature of the present invention, the mounting can be made integral with a plastic mounting component. The webs and one frame may then be made of one piece with the mounting component, and the second frame can then be connected with the webs.

Another advantage of the present invention is that it allows the manufacture of mountings having the same external dimensions but having different spring constants, the spring constant of any one mounting being selected to meet the needs of the situation. This is achieved by appropriately selecting the material, shape, cross section, number and distribution of the webs, so that it is possible to provide a mounting for any particular application.

FIGURE 1a shows an embodiment of the present invention in which an inner frame 8 and an outer frame 9 are connected to each other by means of spring elements in the form of bent metal strips or wires 10a, 10b, 10c, 10d whose ends are cast into the frames.

In certain cases, such as when the mounting is not called upon to withstand any appreciable radial stresses, the mounting can be simplified by letting the web means be constituted by a coil spring which interconnects the frames. Such an arrangement is shown in FIGURE 2 wherein the outer, square frame 11 is connected to the circular inner frame 12—the same being split at 12a— by means of a spiral spring 13 whose outer end is connected to the frame 11 at 13a and whose inner end is connected to the frame 12 at 13b. The frame 12 may be attached to a hub 14 of a motor.

FIGURE 3 shows an arrangement in which a spring 27 is connected with an outer frame 30 having a stepped or flanged cross section and projecting through an opening of a support 31. The inner, second frame is here constituted by the hub 26 of the motor, this hub being connected to an end plate 25 that serves as the mounting plate. The spring 27 is shown to have two regions 28 and 29, in one of which the spring has a high spring constant and in the other of which the spring has a low spring constant, thereby to provide two regions of hard and soft spring characteristics, respectively.

The spring 13, which is shown in FIGURE 2 and which has a flat configuration so as to lie on the plane common to the two frames 11 and 12, may likewise have regions of different spring constants.

The coil spring of FIGURES 2 and 3 will, in practice, be of sufficient rigidity so as to be just able to support the motor. As in the case of the frames of the mounting of FIGURE 1, the frames of the mountings of FIGURES 2 and 3 may also be provided with fitted surfaces which allow the mountings to be positioned precisely, and the frame or frames may likewise be fashioned as snap rings.

Another feature which facilitates the mounting is to fashion the frame that is to be connected to the motor as a connector-type coupling.

Each of the individual elements of the mounting according to the present invention—assuming the same to be other than integral—may easily be manufactured and readily assembled with the other elements.

Another advantage of the present invention is that, since the various embodiments described above have practically no effect on the physical dimensions of the mounting, the mounting may be standardized, whereas the characteristics of prior art mountings, made wholly of rubber, are to a large extent dependent on the size and shape. This complicates the manufacturing problems, inasmuch as the use of differently configured rubber mountings requires wide tolerances which, in turn, may adversely affect the vibration damping characteristics.

It has been found that a mounting according to the present invention, when used in sound reproducing equipment, for example, in a high-fidelity record player, reduces vibration by −40 db, whereas the best results heretofore attainable with rubber mountings were usually but −20 db, maximally −30 db.

The following is an illustrative example of a mounting in accordance with the embodiment of FIGURE 1:

The frames 1 and 2 are made of plastics and have a thickness of approximately 3 mm. Both frames are square, the outer dimension of frame 1 being 25 x 25 mm. and the inner being 20 x 20 mm., while the outer and inner dimensions of frame 2 are 10 x 10 mm. and 7 x 7 mm., respectively. The webs are constituted by leaf springs made of plastics and having a thickness of 1 mm. As shown in FIGURE 1, there are a total of four leaf springs, arranged to be connected to radially aligned corners of the frames, and each spring is provided with multiple bends to impart to it the zig-zag configuration, from which it will be seen that the webs which act as springs lie within a hollow cylindrical space which is coaxial with the axis of the motor, the ratio of the inner radius $r$ of the space to the outer radius $R$ thereof being 1:2 or less.

Figure 4:
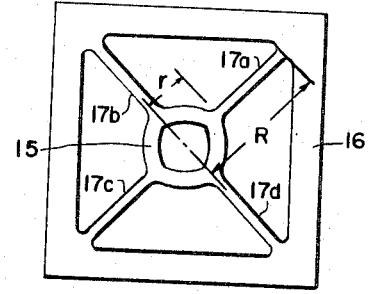
FIGURE 4 is a plan view of yet another embodiment of a mounting according to the present invention.

FIGURE 4 also shows a square mounting element, the same consisting of a single integral plastic element, e.g. a polyamide. One portion of this integral element forms an inner frame 15, another forms an outer frame 16 and the rectilinear spring elements 17a, 17b, 17c, 17d, which connect with the two frames form angles of 90° with each other. FIGURE 4 also shows the radii $r$ and $R$.

Figure 5:
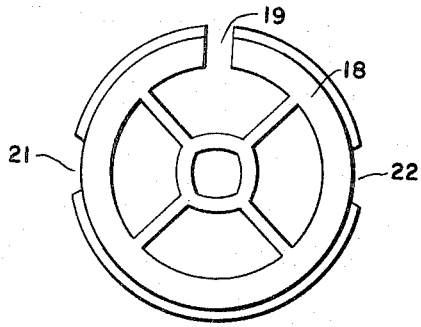
FIGURE 5 is a plan view of yet another embodiment of a mounting according to the present invention.
Figure 5A:
FIGURE 5a is a sectional view taken through the mounting of FIGURE 5.

FIGURES 5 and 5a show a mounting element having a circular outer frame 18 which is fashioned as a split ring having a gap 19. The outer frame 18 is provided with a flange 20 by means of which the mounting element is axially secured. This flange is provided with two gaps 21 and 22 which allow the element to be secured against rotation. As in the case of the element of FIGURE 4, the element of FIGURES 5 and 5a is made of a thermoplastic material.

Figure 6:
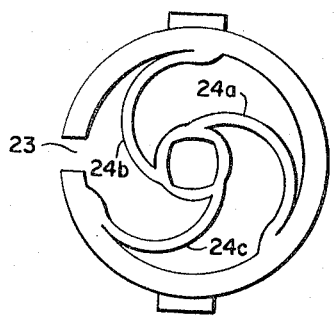
FIGURE 6 is a plan view of yet another embodiment of a mounting according to the present invention.

FIGURE 6 shows another embodiment of a circular mounting element, the outer frame being a split ring 23. The webs are constituted by spiral springs 24a, 24b, 24c.

Figure 7:
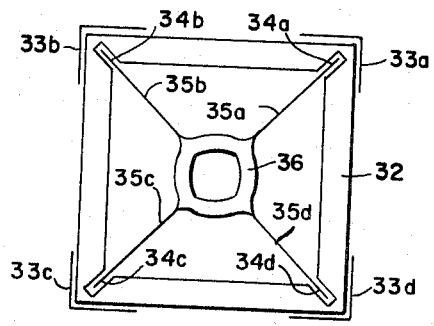
FIGURE 7 is a plan view of yet another embodiment of a mounting according to the present invention.

FIGURE 7 shows another embodiment of a square mounting element having an outer frame 32 whose corners are provided with machined surfaces 33a, 33b, 33c, 33d, so as to allow precise mounting of the element. The inner corners of the outer frame are provided with diagonal slots 34a, 34b, 34c, 34d, into which are pressed the outer ends of leaf springs 35a, 35b, 35c, 35d. The inner ends of the leaf springs are molded into the inner frame 36.

Figure 8:
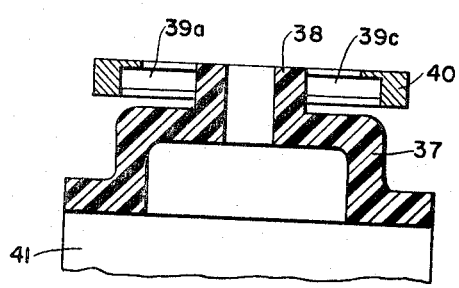
FIGURE 8 is an elevational view, in section, of yet another embodiment of a mounting according to the present invention.

FIGURE 8 shows a bearing plate 37 whose hub 38 serves as the inner frame of the mounting element. The bearing plate is made of a thermoplastic material and the springs 39a, 39b, 39c, 39d, are integrally cast to the hub. The outer frame 40 is placed on the outer ends of the springs 39a, 39b, 39c, 39d. The bearing plate 37 is placed on the stator of the motor 41.

Figure 8A:
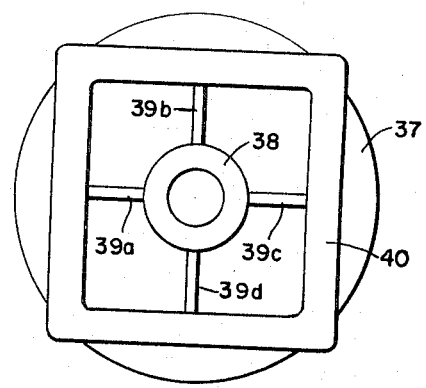
FIGURE 8a is a plan view of the arrangement of FIGURE 8.

FIGURE 8a is a plan view of the arrangement of FIGURE 8 showing the springs 39a, 39b, 39c and 39d, casted to the hub 38 of bearing plate 37 and supporting outer frame 40.

It will be understood that the above description of the present invention is susceptible to various modifications, changes and adaptations, and the same are intended to be comprehended within the meaning and range of equivalents of the appended claims.

What is claimed is:

1. A resilient mounting for use with small electric motors, especially in sound reproducing equipment, for insulating vibration thereof, said mounting comprising, in combination: two frames defining an annular space therebetween and resilient web means interconnecting said frames, said web means acting as springs and lying within said space, which is coaxial with the axis of a motor to be supported by said mounting, the ratio of the inner radius of said space to the outer radius of said space being 1:2 or less.

2. A mounting as defined in claim 1 wherein said frames and web means are arranged in a common plane thereby to form a resilient planar double-frame.

3. A mounting as defined in claim 1 wherein said frames and web means together form a single integral piece which is made of a material selected from the group consisting of plastic and metal.

4. A mounting as defined in claim 1 wherein said frames are made of plastic and said web means are made of metal.

5. A mounting as defined in claim 1 wherein at least one of said frames is split, thereby to allow said one frame to be seated in the manner of a snap ring.

6. A mounting as defined in claim 5 wherein at least one of said frames is provided with flange means for positively engaging a member to which said mounting is to be connected.

7. A mounting as defined in claim 1 wherein at least one of said frames is circular and wherein said at least one frame is provided with means for preventing rotary movement of said circular frame with respect to a member to which said circular frame is to be connected.

8. A mounting as defined in claim 1 wherein said frames are arranged one within the other.

9. A mounting as defined in claim 8 wherein said web means include a plurality of webs extending generally radially between said frames.

10. A mounting as defined in claim 8 wherein said web means include a plurality of generally rectilinear webs.

11. A mounting as defined in claim 8 wherein said web means include a plurality of generally curved webs.

12. A mounting as defined in claim 8 wherein said web means include a plurality of generally zig-zag webs.

13. A mounting as defined in claim 8 wherein said web means include a plurality of webs constituted by metal blades.

14. A mounting as defined in claim 8 wherein said web means include a plurality of webs constituted by metal wires.

15. A mounting as defined in claim 8 wherein said frames are made of plastic and wherein said web means comprise a plurality of metal webs which are firmly seated in said plastic frames.

16. A mounting as defined in claim 15 wherein said webs are embedded in said frames.

17. A mounting as defined in claim 1 wherein one of said frames is constituted by a plastic mounting component of a motor whose vibration is to be insulated.

18. A mounting as defined in claim 1 wherein said web means comprise a coil spring having one end connected to one of said frames and the other end connected to the other of said frames.

19. A mounting as defined in claim 18 wherein said frames and said coil spring are arranged in a common plane.

20. A mounting as defined in claim 19 wherein said coil spring is a metal spiral.

21. A mounting as defined in claim 20 wherein said coil spring has a first region throughout which it has a high spring constant and a second region throughout which it has a low spring constant, thereby to have two regions of hard and soft spring characteristics, respectively.

22. A mounting as defined in claim 18 wherein one of said frames is constituted by the hub of a motor whose vibration is to be insulated.

23. A resilient mounting for use with small electric motors, especially in sound reproducing equipment, for insulating vibration thereof, said mounting comprising, in combination: two frames defining an annular space therebetween; and resilient web means rigidly connected between said frames, said web means acting as springs and lying within said space, which is coaxial with the axis of a motor to be supported by said mounting, the ratio of the inner radius of said space to the outer radius of said space being 1:2 or less.

References Cited by the Examiner
UNITED STATES PATENTS

| | | | |
|---|---|---|---|
| 1,536,407 | 5/1925 | Pettus | 248—358.1 |
| 2,112,473 | 3/1938 | Tolerton. | |
| 2,451,067 | 10/1948 | Butler | 248—358.1 X |
| 2,467,296 | 4/1949 | Doe | 248—26 X |
| 2,756,013 | 7/1956 | Cunningham | 248—26 |
| 2,821,379 | 1/1958 | Donkin et al. | 267—1 |
| 2,832,554 | 4/1958 | Reisch | 248—26 |
| 2,936,140 | 5/1960 | Copeland | 248—26 |
| 2,936,141 | 5/1960 | Rapata | 248—26 |
| 2,942,834 | 6/1960 | Clark | 248—358 |
| 3,037,150 | 5/1962 | Schriner et al. | 248—26 X |
| 3,065,941 | 11/1962 | Loftis | 248—26 |
| 3,084,009 | 4/1963 | Heym | 248—358 X |
| 3,145,012 | 8/1964 | Kfoury | 248—358 |
| 3,185,428 | 5/1965 | Farabaugh et al. | 248—358 |

CLAUDE A. LE ROY, *Primary Examiner.*

JOHN PETO, *Examiner.*